United States Patent
Bethune et al.

(10) Patent No.: US 6,188,768 B1
(45) Date of Patent: Feb. 13, 2001

(54) AUTOCOMPENSATING QUANTUM CRYPTOGRAPHIC KEY DISTRIBUTION SYSTEM BASED ON POLARIZATION SPLITTING OF LIGHT

(75) Inventors: Donald Stimson Bethune, San Jose; William Paul Risk, Sunnyvale, both of CA (US)

(73) Assignee: International Business Machines Corporation, Armonk, NY (US)

(*) Notice: Under 35 U.S.C. 154(b), the term of this patent shall be extended for 0 days.

(21) Appl. No.: 09/052,860

(22) Filed: Mar. 31, 1998

(51) Int. Cl.[7] .................................................. H04L 9/00
(52) U.S. Cl. ............................................................ 380/278
(58) Field of Search ................................................. 380/278

(56) References Cited

U.S. PATENT DOCUMENTS

| | | | |
|---|---|---|---|
| 5,017,974 | * 5/1991 | Greene | 359/321 |
| 5,307,410 | 4/1994 | Bennett | 380/21 |
| 5,515,438 | 5/1996 | Bennett et al. | 380/21 |
| 5,675,648 | 10/1997 | Townsend | 380/21 |
| 5,732,139 | * 3/1998 | Lo et al. | 380/28 |
| 5,757,912 | * 5/1998 | Blow | 380/21 |
| 5,764,765 | * 6/1998 | Phoenix et al. | 380/21 |
| 5,768,378 | * 6/1998 | Townsend et al. | 380/21 |
| 5,808,473 | * 9/1998 | Shinagawa et al. | 324/753 |
| 5,828,681 | * 10/1998 | Epworth | 372/20 |
| 5,850,441 | * 12/1998 | Townsend et al. | 380/21 |
| 5,953,421 | * 9/1999 | Townsend | 380/21 |
| 5,966,224 | * 10/1999 | Hughes et al. | 359/112 |
| 5,999,285 | * 12/1999 | Brandt et al. | 359/112 |
| 6,028,935 | * 2/2000 | Rarity et al. | 380/21 |

FOREIGN PATENT DOCUMENTS

WO 97/44936  11/1997  (WO) .............................. H04L/9/08

OTHER PUBLICATIONS

Schneier, Bruce, Applied Cryptography, 1996, pp. 554–557.*
C. H. Bennett et al., "Eavesdrop–detecting Quantum Communcations Channel", *IBM Technical Disclosure Bulletin*, vol. 26, No. 8, Jan. 1984, pp. 4363–4366.

(List continued on next page.)

*Primary Examiner*—Tod R. Swann
*Assistant Examiner*—Douglas Meislahn
(74) *Attorney, Agent, or Firm*—Thomas R. Berthold

(57) ABSTRACT

A quantum cryptographic key distribution (QKD) system splits discrete light signals from a laser source into a pair of light pulses that are orthogonally polarized with respect to each other, imparts a phase shift to one or both of these separate pulses during their round trip from the sender to the receiver and back, assures that the return pulses from the receiver are attenuated to single-photon pulses, recombines the phase-shifted pulses at the sender, and then detects from the recombined signal its polarization state, which is representative of the net phase shift imparted by the sender and receiver. The phase modulator at the receiver transmits only one polarization (e.g., vertical), but is used in a manner that permits it to equally modulate both polarization components of an arriving pulse. In this arrangement, when both components of a pulse reach the phase modulator at the receiver, they are both entirely vertically polarized and a phase shift is imparted at that time. This has the advantage that the effect of any time variation or phase errors in the phase modulator will be the same on both components. The key information is decoded at a detection stage at the sender that uses two detectors, one of which detects a first polarization state corresponding to the phase difference between the two phase shifts being 0 and the other of which detects a second polarization state corresponding to the phase difference between the two phase shifts being $\pi$.

13 Claims, 5 Drawing Sheets

OTHER PUBLICATIONS

C. H. Bennett et al., "Quantum Cryptography: Public Key Distribution and Coin Tossing", *International Conference on Computers, Systems & Signal Processing*, Bangalore, India, Dec. 10–12, 1984, pp. 175–179.

C. H. Bennett et al., "Quantum Public Key Distribution System", *IBM Technical Disclosure Bulletin*, vol. 28, No. 7, Dec. 1985, pp. 3153–3163.

C. H. Bennett et al., "Quantum Cryptography", *Scientific American*, Oct. 1992, pp. 50–57.

M. Martinelli, "A Universal Compensator for Polarization Changes Induced By Birefringence on a Retracing Beam", *Optics Communications*, vol. 72, No. 6, Aug. 15, 1989, pp. 341–344.

A. Muller et al., "Plug and Play'Systems for Quantum Cryptography", *Applied Physics Letter*, vol. 70, No. 7, Feb. 17, 1997, pp. 793–795.

H. Zbinden et al., "Interferometry with Faraday Mirrors for Quantum Cryptography", *Electronics Letters*, vol. 33, No. 7, Mar. 27, 1997, pp. 586–588.

* cited by examiner

AUTOCOMPENSATING QUANTUM CRYPTOGRAPHIC KEY DISTRIBUTION SYSTEM BASED ON POLARIZATION SPLITTING OF LIGHT

TECHNICAL FIELD

This invention relates to secure communication channels and more particularly to a secure optical communication channel for the transmission of cryptographic key information using single photons.

BACKGROUND OF THE INVENTION

Quantum cryptographic key distribution (QKD) systems transmit cryptographic key data encoded in the quantum states of individual optical photons. QKD was first described by C. H. Bennett et al., "Quantum Cryptography: Public key distribution and coin tossing," *Proc. Int. Conf. Computer Systems and Signal Processing*, pp. 175–179 (Bangalore 1984). The benefits of such a system are that it allows secure transmission of key data over unsecured optical links with security guaranteed by the fundamental quantum properties of light rather than by computational complexity or barriers to interception. This is possible because single photons cannot be split into smaller pieces (intercepted or diverted photons simply won't arrive at the intended destination), nor can they be intercepted and consistently regenerated in identical states since their states cannot be fully characterized by single measurements, leading inevitably to errors in the states of the replacement photons.

Practical systems for distribution of cryptographic keys using quantum cryptography protocols require transmission of single-photon optical signals through some medium, such as optical fiber. Since these protocols encode information in the phase or polarization of the photons, phase and polarization state changes due to mechanical and thermal stresses on the fiber, or to fiber imperfections, must be eliminated or compensated to a degree that permits reliable interferometric detection of the encoded information. In addition, the two parties needing to share a cryptographic key must be able to exchange timing and auxiliary information via a conventional channel.

A technique described by Martinelli in *Opt. Comm.*, 72, 341 (1989) permits automatic, passive compensation for the polarization-transforming effect of the fiber. In this technique light is transmitted through an optical fiber, passes through a Faraday rotator, reflects from a mirror, and returns through the Faraday rotator and fiber. It can be shown that the polarization state of the light returning to the input end of the fiber is always orthogonal to the polarization state of the input light, independent of the polarization transformation induced by the fiber. This effect is referred to as Faraday ortho conjugation.

A quantum cryptographic key distribution system based on a long-path, time-multiplexed interferometry that utilized the Faraday ortho conjugation effect to automatically compensate uncontrolled birefringence effects has been described by Muller et al. in "Plug and play systems for quantum cryptography," *Appl. Phys. Lett.* 70, 793–5 (1997). The system has excellent interference characteristics (>99% contrast ratio) and clearly shows the value of the auto compensation technique. However, it has several significant weaknesses, including the following:

(1) As implemented, it requires fast phase modulators capable of transmitting both polarizations of light, whereas most available waveguide modulators transmit only a single polarization.

(2) Photons carrying one of the bit values are not sent to a detector. This single detection channel arrangement reduces the data rate by one half.

(3) It requires the use of three Faraday mirrors.

(4) Optical clutter caused by the use of a standard beamsplitter with a do pair of Faraday mirrors to generate a delayed pulse, gives an infinite series of "echo" pulses. Each of these clutter pulses is a factor $T^2$ smaller than the last (where T is the intensity transmittance of the delay line beamsplitter). The use of a high value of T (T close to 1) means that the echo pulses take many delay line periods to die out, limiting the bit transmission rate.

(5) The single-photon detector sees a reflected laser pulse and an echo series with every shot. In addition, the 2-state protocol used will also direct strong pulses at the detector. These strong extra pulses striking the detector will increase noise counts and limit repetition rate.

The Muller et al. reference also suggests a polarization-encoded system that uses light pulses with specific polarization states, but does not describe an actual implementation.

Thus, what is needed is a practical autocompensated fiber optical system for quantum cryptographic key distribution that eliminates the weaknesses described above.

SUMMARY OF THE INVENTION

The invention is a QKD system that splits discrete light signals from a laser source into a pair of light pulses that are orthogonally polarized with respect to each other, imparts a phase shift to one or both of these separate pulses during their round trip from the sender to the receiver and back, assures that the return pulses from the receiver are attenuated to single-photon pulses, recombines the phase-shifted pulses at the sender, and then detects from the recombined signal its polarization state, which is representative of the net phase shift imparted by the sender and receiver. A polarization preparation and laser isolation stage at the sender converts the light signals from the laser into light signals with equal amplitude horizontal and vertical polarizations, while also assuring that no return light from the receiver is discarded or sent back to the laser. The phase modulator at the receiver transmits only one polarization (e.g., vertical), but is used in a manner that permits it to equally modulate both polarization components of an arriving pulse. In this arrangement, when both components of a pulse reach the phase modulator at the receiver, they are both entirely vertically polarized and a phase shift is imparted at that time. This has the advantage that the effect of any time variation or phase errors in the phase modulator will be the same for both components. The key information is decoded at a detection stage at the sender that uses two detectors, one of which detects a first polarization state corresponding to the phase difference between the two phase shifts being 0 and the other of which detects a second polarization state corresponding to the phase difference between the two phase shifts being $\pi$.

The use of a Faraday mirror at the receiver, together with the requirement that each of the separate pulses travels the same total path length back to the point where it is recombined into the recombined signal, results in an autocompensating system that eliminates the birefringence effects of the optical fiber. The invention allows the use of single polarization phase modulators, such as annealed proton-exchange waveguide modulators, and thus eliminates the need to use fast phase modulators that are capable of transmitting both polarizations of light. The use of a single Faraday mirror in combination with polarizing beamsplitters eliminates "echo" or "clutter" pulses from the system.

For a fuller understanding of the nature and advantages of the present invention, reference should be made to the following detailed description taken together with the accompanying figures.

DETAILED DESCRIPTION OF THE INVENTION

Prior Art

Figure 1:
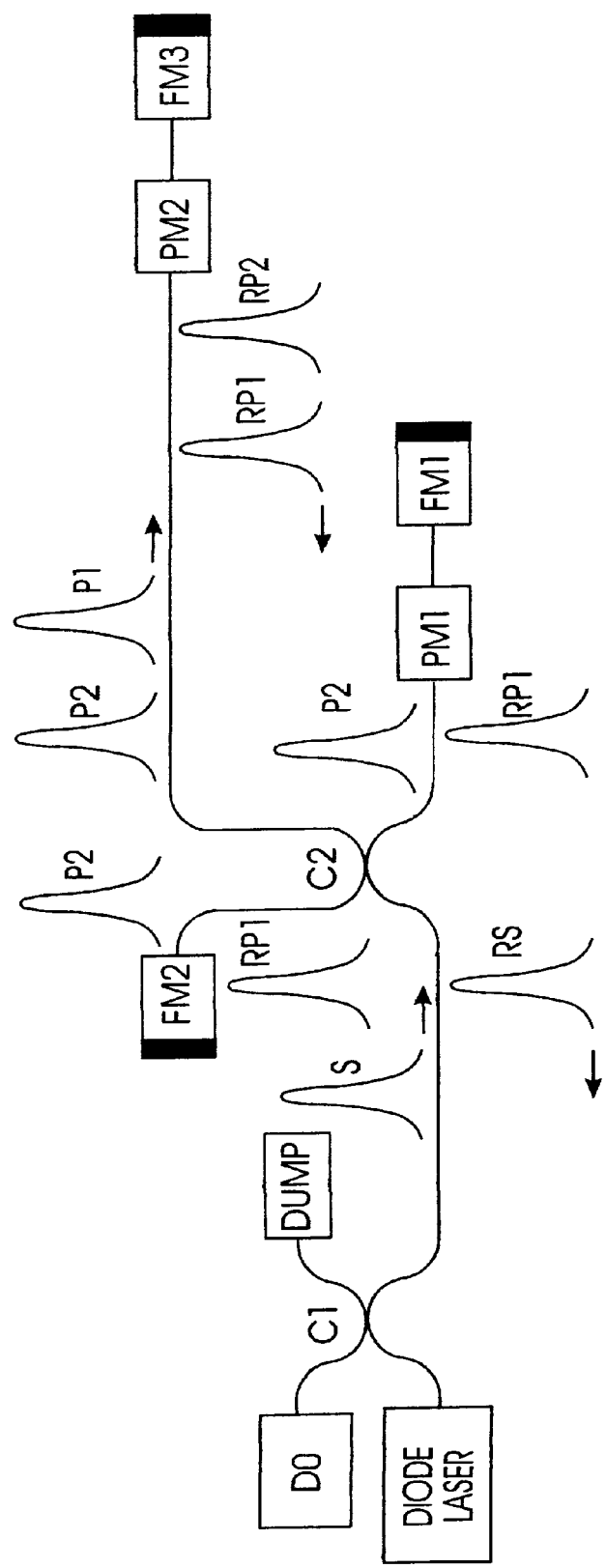
FIG. 1 is a schematic of a prior art autocompensating fiber-optic quantum key distribution channel.

Shown in FIG. 1 is a prior art autocompensating quantum key distribution system for a fiber-optic communication channel. At the first channel end, a diode laser generates signals S of arbitrary polarization that travel along the fiber to directional coupler C2. At C2, the signal S is split into two pulses. A first pulse P1 travels out the fiber link to the second channel end. The second pulse P2 split at coupler C2 travels to Faraday mirror FM1, back through coupler C2 to Faraday mirror FM2, back to coupler C2 and out the fiber link to the second channel end. Pulse P2 thus has a time delay behind pulse P1 due to its bounce between the two Faraday mirrors FM1, FM2. Each of the Faraday mirrors has rotated the polarization of P2 90 degrees so that when it is directed to the second channel end, it has essentially the same arbitrary polarization as P1 had when it left C2.

When the signal S reaches coupler C1 from the laser, a portion of it is also diverted to the dump, and thus wasted. When P2 returns to C2 from FM1, a portion of it is directed back to the laser and detector D0, and the remainder travels to FM2 and then back to C2, where, in addition to the desired P2 pulse directed out the fiber link to the second channel end, a still smaller portion is directed back to FM2. This process will repeat indefinitely, resulting in subsequent additional smaller "echo" pulses, referred to as optical clutter, that continue to pass through the fiber link between the two channel ends. This is undesirable because these "echo" pulses take many delay line periods to die out, limiting the bit transmission rate.

When pulses P1, P2, which have essentially an arbitrary polarization, reach the Faraday mirror FM3 at the second channel end, they are reflected back with orthogonal polarization and only the second pulse P2 is phase modulated at the phase modulator PM2. P1 and phase modulated P2 are sent back to the first channel end as return pulses RP1 and RP2, respectively. When RP1 reaches coupler C2 at the first channel end, it is split into a portion which goes to FM2 and is reflected back to FM1. Other portions of RP1 enter the laser and detector D0. RP1 is phase modulated at phase modulator PM1 and then reflected back to C2 by FM1. When the RP1 pulse reaches C2 from the mirror FM1, it arrives there at the same time as RP2 from the second channel end. RP1 and RP2 will interfere at the directional coupler C2, and depending on the relative phase applied to RP1 by PM1 and P2 by PM2, they will combine to give two variable portions directed towards FM2 and C1. If no phase shifts are applied or if the difference in phase shifts is zero, then the interference at C2 will be constructive and the combined pulse RS will be directed to C1 at the first channel end, where a portion of it will be sent to D0. The interference will be destructive when the phase difference is equal to $\pi$. Then the combined pulse RS will be directed towards FM2, and no light will be detected by D0. The use of the Faraday mirrors FM1 and FM2 to assure that the two pulses travel the same exact path length from C2 to FM3 and back, together with the use of FM3 to rotate the polarizations of the pulses for half of their travel to cancel out all birefringence effects in the optical fibers, allows high contrast interferometry to be achieved in spite of any stress or thermally induced fiber birefringence or index variations, provided that these effects vary slowly compared to the optical round trip time. Thus this type of system is referred to as an autocompensating QKD system.

Preferred Embodiments

Figure 2:
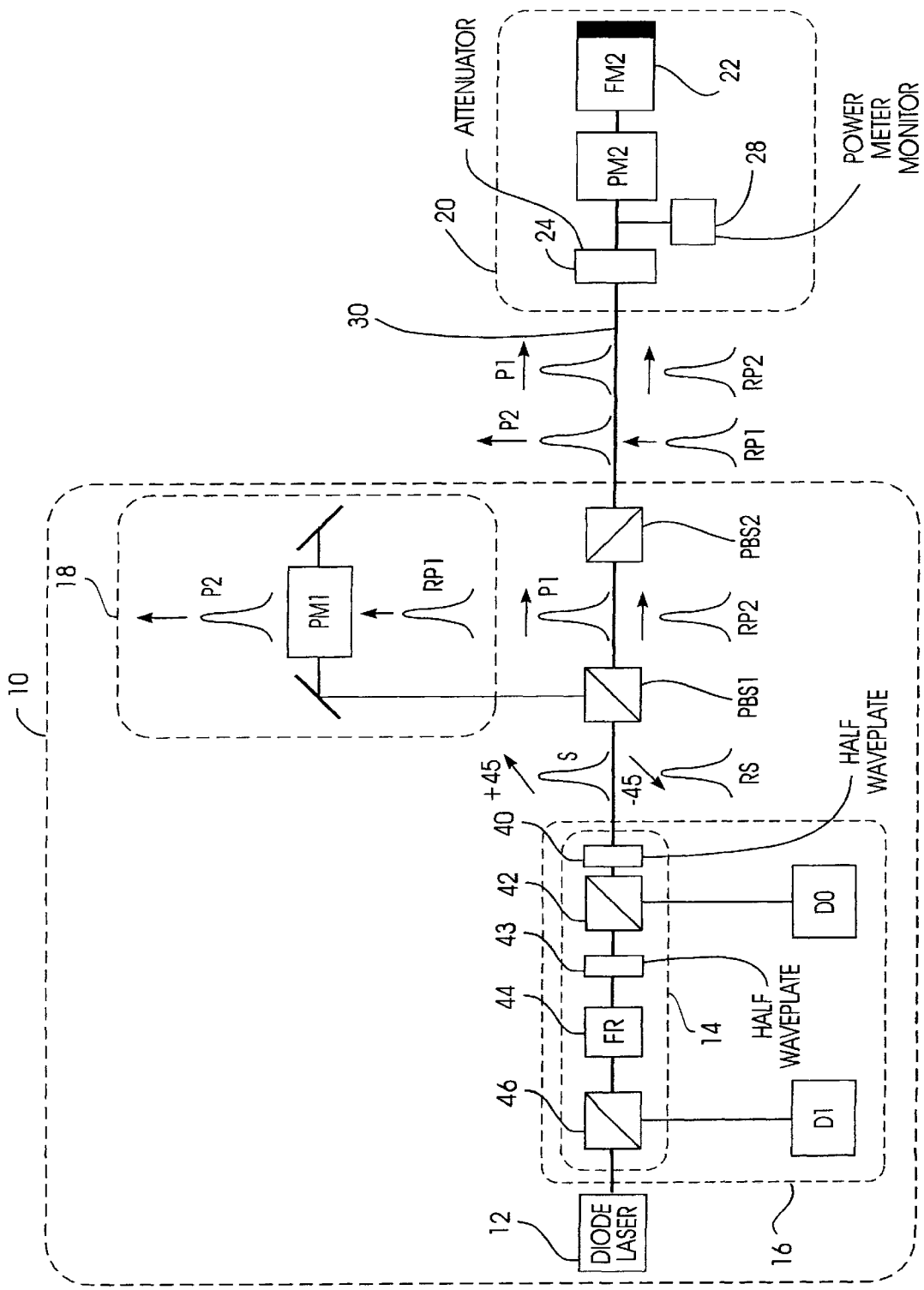
FIG. 2 is a schematic of the autocompensating quantum key distribution channel using polarizing beamsplitters according to the present invention.

Referring to FIG. 2, an overall schematic of the communication channel for distribution of quantum cryptographic key information is illustrated. The channel includes a first channel end 10 that contains a light source, such as a diode laser 12, for generating discrete light signals, a second channel end 20, and an optical link 30, such as an optical fiber, connecting the two channel ends 10, 20. The invention will be described in FIG. 2 and subsequent figures with bulk optical components. The communication channel is applicable to free-space optical communication as well as fiber-optic communication. The bulk optical components described have equivalent functions in commercially available fiber-optic components.

The first channel end 10 includes the diode laser 12, a polarization preparation and laser isolation stage 14, a detection stage 16 for detecting the return light signal from second channel end 20, first and second polarizing beamsplitters PBS1 and PBS2, and a first phase modulator PM1 located within a delay stage 18. The second channel end 20 includes a Faraday mirror (FM) 22 for returning light pulses received from the first channel end back with orthogonal polarization. The FM 22 may comprise a Faraday rotator and a conventional mirror. The second channel end 20 also includes an attenuator 24 that assures that the return light pulses are substantially single-photon pulses, and a second phase modulator PM2 that allows the user at the second channel end 20 to provide key information by phase modulating the return light pulses before they are sent back to the first channel end 10.

In operation, the diode laser 12 is controlled by a master clock and generates light signals at discrete clock cycles that pass through a polarization preparation and laser isolation stage 14. The light signal S at the output of stage 14 is a signal that has both horizontal and vertical polarizations, with the two orthogonal polarizations having equal amplitudes, so that S will have a polarization state of +/−45 degrees. This occurs in the following manner. The output of diode laser 12 is preferably horizontally polarized. However at polarizing bearmisplitter 46 any vertically polarized component is rejected and only horizontally polarized light reaches Faraday rotator 44 where its polarization is rotated by 45 degrees. Half waveplate 43 rotates the polarization back by 45 degrees so that the light reaching polarizing beamsplitter 42 is again horizontally polarized. The two polarizing beamsplitters 46, 42, the Faraday rotator 44 and the half waveplate 43 together form a Faraday isolator, which means that horizontally polarized light from diode laser 12 going out polarizing beamsplitter 42 will have no polarization rotation, while horizontally polarized light returning back in the opposite direction will have its polarization rotated by 90 degrees so that polarizing beamsplitter 46 will direct this light to D1 and not to laser 12. For departing light, half waveplate 40 then rotates the polarization of the light from polarizing beamsplitter 42 by 45 degrees so that the light signal S will have a polarization state of +/−45 degrees.

In an alternative embodiment, the half waveplate 40 can be replaced by a quarter waveplate. Thus, instead of signal S having linear polarization with equal amplitude vertical and horizontal components, the signal S will be circularly polarized with vertical and horizontal components with amplitudes of equal magnitude.

The signal S is then directed to PBS1 where it is split into a pair of separate pulses, a first pulse P1 that is horizontally polarized and passes through PBS2 and out through fiber-optic channel link 30 toward second channel end 20, and a second pulse P2 that is vertically polarized and passes to delay stage 18 through phase modulator PM1, then back to PBS2 and out to fiber-optic link 30. As shown in FIG. 1, the two pulses P1, P2 leaving PBS2 are separated by a time delay caused by the passage of the second vertically polarized pulse P2 through the delay stage 18. On the outward passage from first channel end 10 toward second channel end 20, the user at the first channel end 10 does not perform any phase modulation at PM1.

The two pulses P1, P2 then travel through the fiber-optic link 30 and pass through an aftenuator 24 at the second channel end 20. The attenuator 24 may be a conventional 2×2 fiber optic coupler that allows only a small percentage, e.g., 5%, of the input light to pass, or a fixed attenuator, which may be a short break in the optical fiber that allows a large percentage of the light to be scattered. The pulses P1, P2 then reflect from Faraday mirror 22 with their polarizations exchanged. They then return through phase modulator PM2. At PM2, the user at the second channel end modulates the second pulse P2 to slightly modify its phase. This phase modulation corresponds to key information that will be-decoded in the manner to be described below. In the preferred embodiment only P2, and not the first pulse P1, is modulated at phase modulator PM2. The two pulses then pass a second time through attenuator 24, which assures that the return pulses are single-photon pulses. The term "single-photon pulse" as used herein means that in each clock cycle there is in general no more than one and on average significantly less than one photon present in the pulse. Thus, for example, if on average the attenuator allows only a single photon to pass for every 10 clock cycles, this is described as a QKD system where only 0.1 photons/pulse are used to transmit the key information. Also shown at the second channel end is a power meter monitor 28 for detecting how much light is received at the second channel end. The power meter monitor 28 can be used to detect if an eavesdropper is probing the system with pulses.

The two pulses on their return to the first channel end 10 are designated as a pair of return pulses RP1 and RP2, and are separated by the same time delay as applied at the first channel end 10, but with the second return pulse RP2 having a phase shift applied by PM2. As shown in FIG. 2, the return pulses RP1 and RP2 have their polarizations rotated 90 degrees from their corresponding pulses P1, P2 when they arrive back at PBS2, because of the orthogonal polarization rotation applied by FM 22. Because RP1 now has vertical polarization when it reaches PBS2, at the first channel end 10 it is directed through delay stage 18 and phase modulator PM1 where the first user at channel 10 may apply phase modulation. The second pulse RP2, which now has horizontal polarization, passes through PBS2 and reaches PBS1. Because each of the pair of pulses has traveled precisely the same distance from PBS1 to the Faraday mirror 22 and back to PBS1, the return pulse RP1 and the return pulse RP2, which has passed through delay stage 18, will recombine at PBS1 into a single return signal designated RS. Signal RS will have a polarization state that is determined by the difference of the phase shifts imparted to P2 and RP1 by PM2 and PM1, respectively, prior to their recombination at PBS1.

The timing of the channel is controlled by a master clock at the first end that clocks the pulsing of both the diode laser 12 and a second timing laser that sends timing signals through a wavelength multiplexer from the first to the second channel end through the same fiber-optic link 30. Thus, for example, if the diode laser 12 is operating at 1.3 micron wavelength, the timing laser may operate at 1.5 micron wavelength, but both lasers are synchronized by the master clock and send pulses at the same pulse repetition rate. The timing pulses received at the second channel end serve to synchronize PM2 to the arriving pulses P1 and P2. When the user at the second end phase modulates P2 with PM2, a timing pulse is also returned as an echo pulse. This echo timing pulse is received at the first channel end and used to control the timing of phase modulator PM1.

Unlike the prior art technique, there has been no discarded light signal. For example, all of the light entering PBS1 from the laser 12 has been directed either through the delay stage 18 or out to the fiber-optic link 30 without any reflection back toward diode laser 12. The use of a single Faraday mirror in combination with polarizing beamsplitters eliminates "echo" or "clutter" pulses from the system. In addition, only a single Faraday mirror is required to perform the autocompensated interferometry.

The operation of detection stage 16 will now be described to explain the manner in which the polarization state of signal RS is determined to thereby enable the key information encoded by the users at PM2 and PM1 to be decoded. There are two cases of interest, depending on whether the difference of the phases of RP1 and RP2, $\Delta\phi$, is an even or an odd multiple of $\pi/2$. In the first case, if $\Delta\phi$ is an even multiple of $\pi/2$, the signal RS first passes through half waveplate 40 that rotates its polarization 45 degrees so that its polarization state exiting half waveplate 40 will be either horizontal or vertical. The signal then enters polarizing beamsplitter 42. If the polarization state has been rotated to vertical by waveplate 40, then the polarizing beamsplitter 42 directs the signal to detector D0. If, on the other hand, the waveplate 40 has rotated the polarization to horizontal, it then passes through polarizing beamsplitter 42 to half waveplate 43 and Faraday rotator 44. For light in the direction back toward diode laser 12 half waveplate 43 rotates the polarization by 45 degrees and Faraday rotator 44 rotates it by another 45 degrees. Thus half waveplate 43 and Faraday rotator 44 together serve as a means for rotating the horizontally polarized signal that has passed through polarizing beamsplitter 42 to vertical. This signal is then directed by polarizing beamsplitter 46 to detector D1. The polarizing beamsplitters 42, 46 are shown in FIG. 2 as bulk optic polarizing beamsplitters.

The detection stage 16 in FIG. 2 has two detectors D0, D1, one or the other of which receives all of the light of return signal RS and each detector detects only a single polarization state of the return signal RS. Because the only signal reaching the polarizing beamsplitter 46 is a vertically polarized signal, all of the light reaching polarizing beamsplitter 46 is directed to detector D1 and no light is directed into diode laser 12. Thus, all of the return light in the return signal RS is directed entirely to one or the other of detectors D0, D1.

A signal at D0 means that an equal phase shift (or no phase shift) has been applied to the two pulses. A signal at D1 means that different phase shifts (phase difference of $\pi$) has been applied to the two pulses.

In the second case, where $\Delta\phi$ is an odd multiple of $\pi/2$, RS will be circularly polarized after recombining at PBS1 and will remain circularly polarized after passing through half waveplate 40. Polarizing beamsplitter 42 will then divide RS into two equal intensity portions that will arrive at D0 and D1. A single photon signal will arrive at one or the other detector randomly with equal probability.

In the four-state QKD protocol there are two bases that can be selected by the users. In the "even" basis, 0 and $\pi$ are the possible phase shifts for the receiver that can be applied by PM2 and the sender applies no phase shift using PM1. In the "odd" basis, $\pi/2$ and $3\pi/2$ are the possible phase shifts applied by the receiver using PM2 and the sender applies a phase shift of $\pi/2$ using PM1. Both the sender and the receiver randomly choose a basis for each pulse. In addition, the receiver chooses which of the two values for a given basis to use, thus coding a bit value. In the even (or odd) basis the phase modulator imparts a phase shift that is an even (or odd) multiple of $\pi/2$. The polarization state of the return signal RS will depend on the phase difference $\Delta\phi = (\phi_{PM2}-\phi_{PM1})$ between the recombining amplitudes of RP1 and RP2.

If the sender's and receiver's bases agree, $\Delta\phi$ will be an even multiple of $\pi/2$. If $\Delta\phi=0$, photons will be directed deterministically to D0 and if $\Delta\phi=\pi$, photons will be directed deterministically to D1.

If sender and receiver choose different bases, $\Delta\phi$ will be an odd multiple of $\pi/2$, and the photons will divide randomly between the detectors, so no information is transmitted. The following table explains this four-state QKD protocol.

| $\phi_{PM1}$ $\phi_{PM2}$ | 0 | $\pi/2$ |
|---|---|---|
| 0 | D0 | ? |
| $\pi/2$ | ? | D0 |
| $\pi$ | D1 | ? |
| $3\pi/2$ | ? | D1 |

Figure 3A:
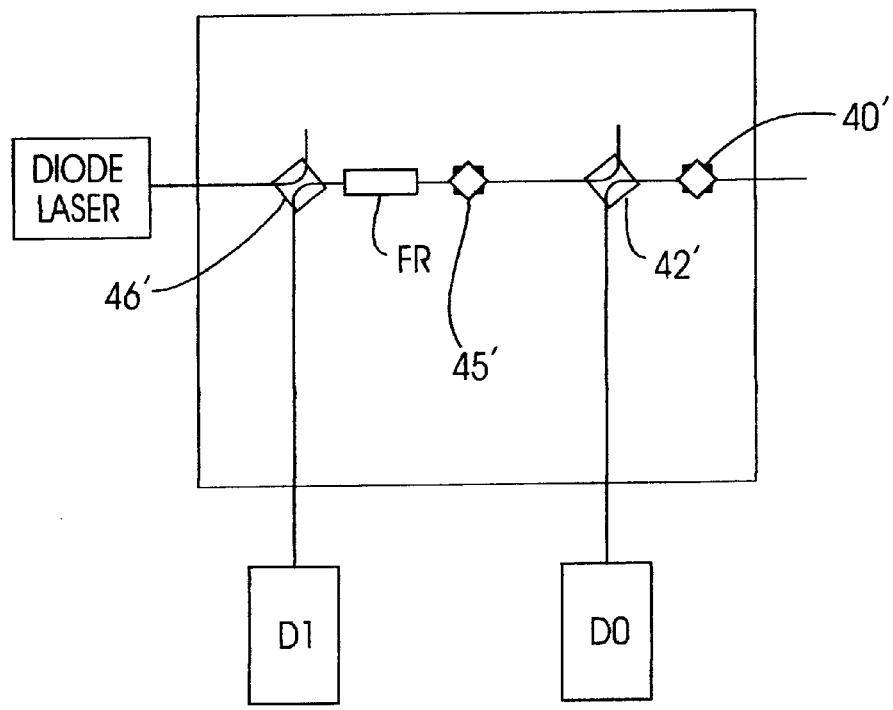
FIG. 3A is a fiber-optic implementation of the polarization preparation and detection stage portion of the present invention.

FIG. 3A illustrates a fiber-optic embodiment of the detection stage 16. Forty-five-degree fiber-optic couplers 40', 45' replace the waveplates 40, 43, respectively, and 2×2 fiber-optic polarizing couplers 42', 46' replace the bulk optic polarizing beamsplitters 42, 46, respectively. The fiber in detection stage 16 is polarizing maintaining fiber and the 45 degree couplers align the polarization maintaining fiber principal axes at 45 degrees to one another. The forty-five-degree fiber-optic coupler 45' and the Faraday rotator (FR) together serve as the means for rotating the horizontally polarized signal that has passed through coupler 4' to vertical.

Figure 3B:
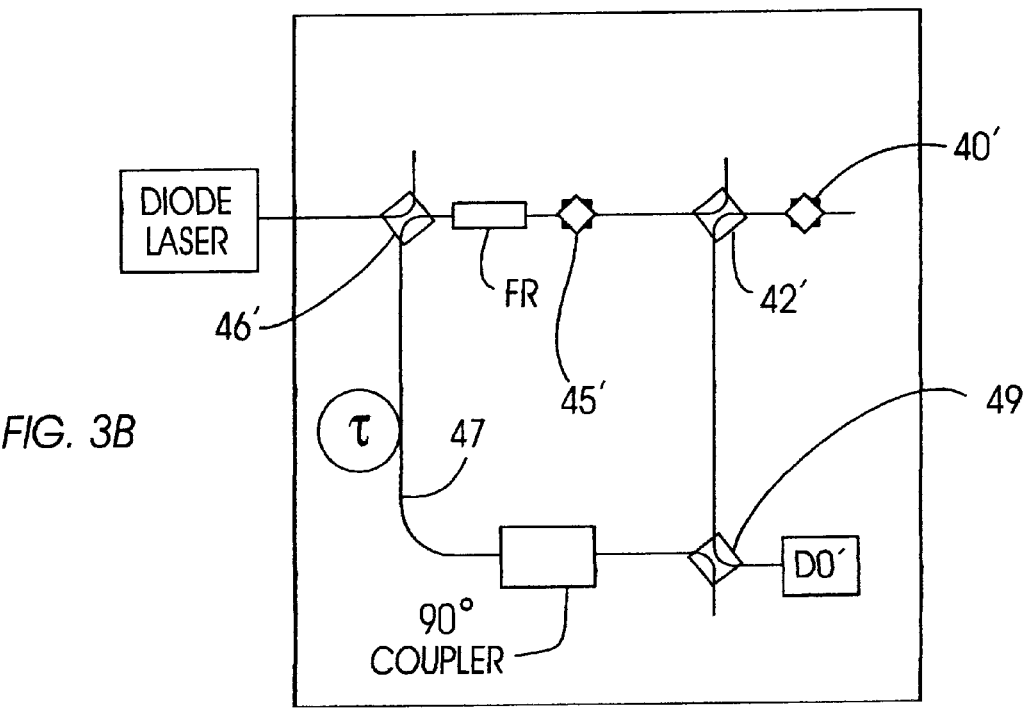
FIG. 3B is a fiber-optic alternative embodiment of the polarization preparation and detection stage of the present invention illustrating the use of a single detector and a time delay line.

FIG. 3B illustrates an alternative embodiment of the detection stage 16 in its fiber-optic implementation and uses a single detector D0' that detects both polarization states, but wherein the polarization state detected is determined by its arrival time at detector D0'. Thus, detector D0' detects the first polarization state in the same manner as detector D0' in the embodiment of FIG. 2A, but the horizontally polarized signal from coupler 42' is rotated to vertical and directed by coupler 46' through a delay line 47, where a time delay $\tau$ is introduced, and through a 90-degree coupler and a 2×2 polarizing coupler 49 back to detector D0'. By observing the arrival time of optical pulses at D0', the polarization state of RS can be inferred.

Figure 4:
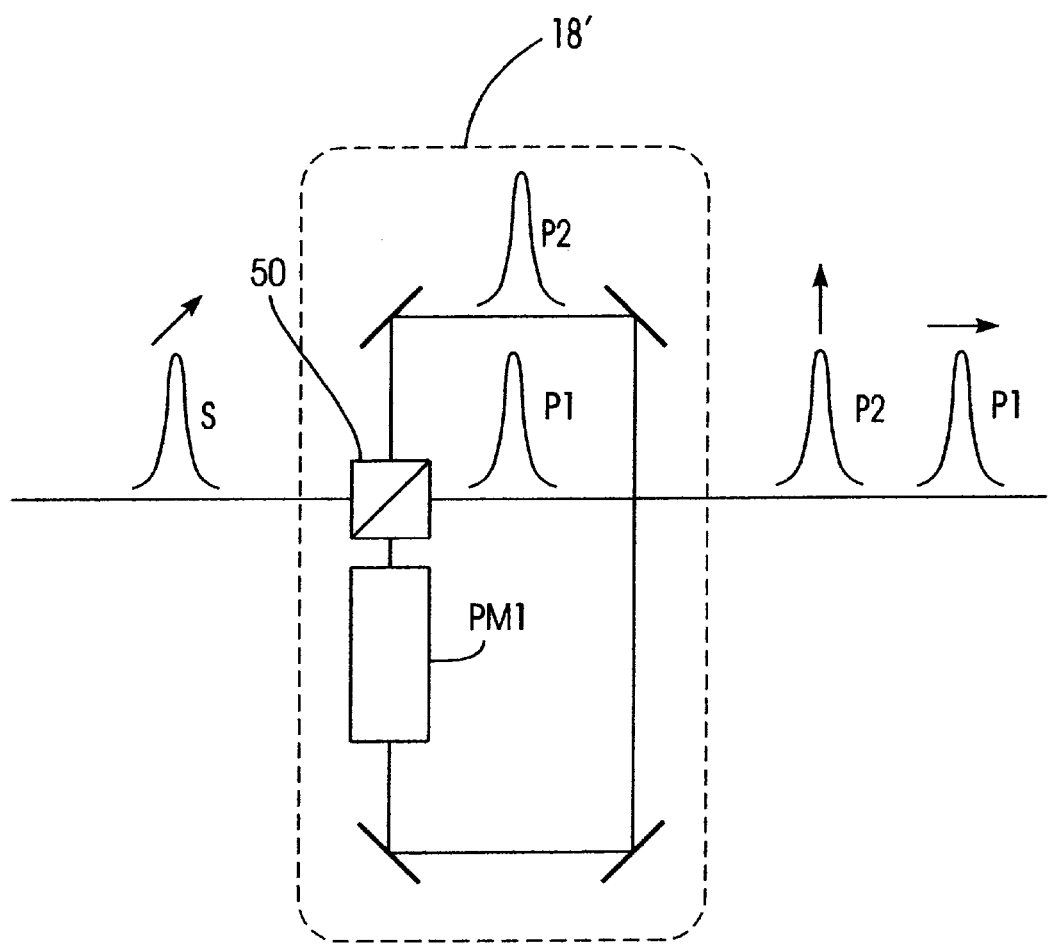
FIG. 4 is an illustration of the present invention wherein a single 4-port polarizing beamsplitter is used to replace the first and second polarizing beamsplitters in the first channel end of the invention illustrated in FIG. 2.

Referring now to FIG. 4, a delay stage 18' is illustrated wherein a single 4-port polarizing beamsplitter 50 replaces the first and second polarizing beamsplitters PBS1 and PBS2 of FIG. 2. In this embodiment, the input signal S is split into a pair of pulses by the 4-port polarizing beamsplitter 50, one with vertical polarization (P2) and one with horizontal polarization (P1). The horizontal polarization pulse P1 passes through beamsplitter 50 to fiber-optic link 30. The vertically polarized pulse P2 is sent around the path that uses four mirrors. This path constitutes the delay stage 16' and includes the phase modulator PM1. The pulse P2 goes through phase modulator PM1 and back to polarizing beamsplitter 50 where it is redirected back out to fiber-optic link 30 with a time delay behind first pulse P1. In a fiber-optic embodiment corresponding to FIG. 4, the 4-port polarizing beamsplitter may be a 2×2 fiber-optic polarizing coupler.

Figure 5A:
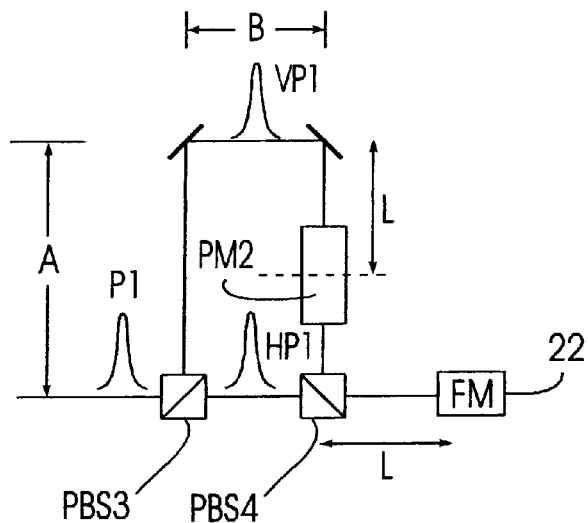
FIG. 5A is an illustration of the phase modulator and Faraday mirror at the second channel end of the invention illustrated in FIG. 2.

Referring now to FIG. 5A, details of the phase modulator PM2 and Faraday mirror FM 22 at the second end station 20 are illustrated. The purpose of the end station embodiment of FIG. 5A is to allow the use of a phase modulator PM2 which transmits only one polarization (e.g., vertical) to equally modulate both polarization components of an arriving pulse (e.g., P2). Even though the pair of pulses P1, P2 are initially horizontally and vertically polarized, respectively, when transmitted from the first channel end 10, there will be arbitrary deviation from these polarization states induced by travel through fiber-optic link 30.

The operation of channel end 20 will be described only with respect to the first pulse P1, which is was entirely horizontally polarized on leaving PBS2, but it is understood that operation with respect to the second pulse P2, which was vertically polarized on leaving PBS2, will be similar. P1 first enters a third polarizing beamsplitter PBS3 where it is split into its vertical and horizontal components, VP1 and HP1, respectively. The vertical component VP1 is directed to the two mirrors and then to phase modulator PM2. The distance traveled by the vertical component corresponds to the sum of A+B+L, as shown in FIG. 5A. The horizontal component HP1 of P1 is sent from PBS3 to fourth polarizing beamsplitter PBS4, then to Faraday mirror FM 22 where its polarization is rotated to vertical, then back to PBS4 where it is redirected as a vertical component back to PM2. In the preferred embodiment of end station 20, the distance of travel of HP1 from PBS3 to PM2 is equal to B+L+L+(A−L), as can be seen from FIG. 5A. This total distance (which algebraically reduces to A+B+L) corresponds precisely to the distance traveled by VP1. As a result, when both components of P1 reach PM2, they are both entirely vertically polarized and a phase shift is imparted at that time. This has the advantage that the effect of any time variation or phase errors in phase modulator PM2 will be the same for both components.

The two components then return in opposite paths back to PBS3 where they are recombined into a single return pulse RP1, which has now been phase shifted. Because each of the components of P1 has been returned by FM 22, the recombined RP1 will have a polarization that is precisely orthogonal to the polarization of P1 when it entered PBS3 from the fiber-optic link 30.

Figure 5B:
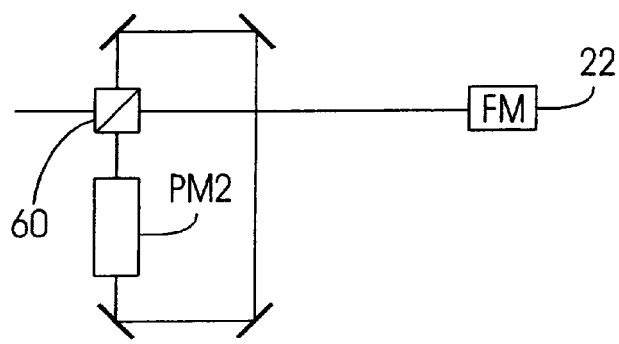
FIG. 5B is an illustration of an embodiment of the second channel end wherein a single 4-port polarizing beamsplitter replaces the third and fourth polarizing beamsplitters shown in FIG. 5A.
Figure 5C:
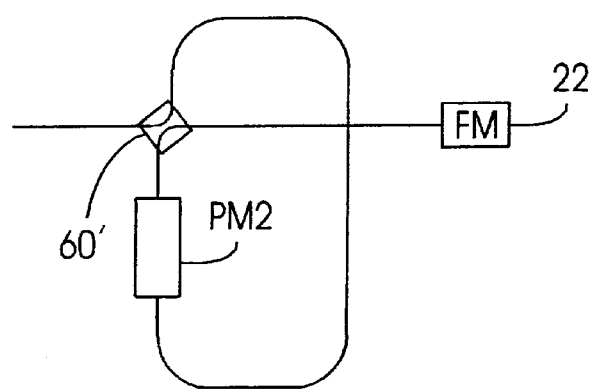
FIG. 5C is a fiber-optic implementation of the embodiment of FIG. 5B wherein a 2×2 polarizing fiber-optic directional coupler is used as the 4-port polarizing beamsplitter.

FIG. 5B illustrates an embodiment of end station 20 wherein PBS3 and PBS4 are replaced by a single 4-port polarizing beamsplitter 60. Four-port polarizing beamsplitter 60, when used in conjunction with the invention shown in FIG. 2, can be considered as the third polarizing beamsplitter. FIG. 5C illustrates a fiber-optic implementation of the invention of FIG. 5B wherein the 4-port polarizing beamsplitter is a 2×2 polarizing fiber-optic directional coupler 60'.

The embodiment described above is one wherein one phase modulator phase shifts one of the pulses, and the other phase modulator phase shifts the other pulse. However, the present invention functions equally as well if both phase modulators impart a phase shift to the same pulse. This is because the detection technique relies on extraction of the net phase shift from the combined signal RS, not from the phase shifts imparted to the separate pulses before they combine.

The present invention allows the use of single-polarization phase modulators, such as annealed proton-exchange waveguide modulators, and thus eliminates the need to use fast phase modulators that are capable of transmitting both polarizations of light. By using polarizing beamsplitters in the manner described in the present invention, there are no echo pulses generated, and thus no optical clutter. All of the laser light that is injected into the channel by the diode laser is used to carry the quantum key information to the detection stage.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A communication channel for transmission of cryptographic key information between first and second channel ends comprising:
    a source of discrete light signals at the first channel end;
    a first polarizing beamsplitter at the first channel end for splitting each of the discrete light signals into a pair of first and second light pulses orthogonally polarized with respect to each other, the first pulse being directed from the first polarizing beamsplitter to the second channel end;
    a delay stage at the first channel end through which the second pulse from the first polarizing beamsplitter travels, the second pulse being directed to the second channel end with a time delay relative to the first pulse;
    a first phase modulator at the delay stage for modulating the phase of at least one of the pulses in the pair on its return back to the first channel end from the second channel end to thereby change the relative phase of the first and second return pulses;
    a second phase modulator at the second channel end for modulating the phase of at least one of the pulses in the pair received from the first channel end to thereby change the relative phase of the first and second pulses, said at least one pulse being split into its horizontal and vertical polarization components at the second channel end, the second phase modulator transmitting light of only one polarization but equally modulating both polarization components of said at least one pulse;
    a Faraday mirror at the second channel end for reflecting each of the pulses back to the first channel end as first and second return pulses, the first return pulse having its polarization state rotated ninety degrees, the second return pulse having its polarization state rotated ninety degrees, and the first and second return pulses being orthogonally polarized with respect to each other;
    an attenuator in the channel for assuring that the return pulses are substantially single-photon pulses; and
    a second polarizing beamsplitter at the first channel end for directing the first return pulse through the delay stage, the second return pulse being directed to the first polarizing beamsplitter; whereby the first return pulse travels through the delay stage and the first phase modulator and combines with the second return pulse at the first polarizing beamsplitter to form a recombined return light signal having a polarization state dependent on the relative phase change applied to the first and second return pulses by the first phase modulator and the relative phase change applied to the first and second pulses by the second phase modulator; and
    a detection stage at the first channel end having first and second detectors and means for directing the recombined return light signal to only one detector selected from the first and second detectors, the first detector receiving the recombined return light signal only if the recombined return light signal has a first polarization state and the second detector receiving the recombined return light signal only if the recombined return light signal has a second polarization state.

2. The communication channel according to claim 1 wherein the second phase modulator modulates the phase of only the first or second pulse and the first phase modulator modulates the phase of the pulse not phase modulated by the second phase modulator.

3. The communication channel according to claim 1 wherein the second phase modulator modulates the phase of only the first or second pulse and the first phase modulator modulates the phase of the same pulse phase modulated by the second phase modulator.

4. The communication channel according to claim 1 wherein the Faraday mirror comprises a Faraday rotator and a mirror.

5. The communication channel according to claim 1 further comprising a Faraday isolator between the source of light signals and the first polarizing beamsplitter for preventing the return light signal from entering the source.

6. The communication channel according to claim 1 wherein the detection stage further comprises:
    a first polarization rotator for rotating the polarization of the return right signal to either vertical or horizontal, depending on the polarization state of the return light signal, wherein the first detector receives the vertically polarized light signal from the first polarization rotator representing the first polarization state of the return light signal; and means for rotating the polarization of the horizontally polarized light from the first polarization rotator to vertical, wherein the second detector receives the to vertically polarized light signal from said means for rotating representing the second polarization state of the return light signal.

7. The communication channel according to claim 1 wherein the detection stage comprises:

first polarization rotator for rotating the polarization of the return light signal to either vertical or horizontal, depending on the polarization state of the return light signal;

a detector for receiving the vertically polarized light signal from the first polarization rotator representing the first polarization state of the return light signal;

means for rotating the polarization of the horizontally polarized light from the first polarization rotator to vertical; and a delay line between said means for rotating and the detector for directing the vertically polarized light from said means for rotating to the detector with a time delay from the vertically polarized light signal from the first polarization rotator, wherein the polarization state of the return light signal is determined by its arrival time at the detector.

8. The communication channel according to claim 1 further comprising a third polarizing beamsplitter at the second channel end for directing only vertically polarized components of the first and second light pulses received from the first channel end to the first phase modulator, the horizontally polarized components of the first and second pulses being directed to the Faraday mirror, and wherein the optical path from the third polarizing beamsplitter to the second phase modulator is equal to the optical path from the third polarizing beamsplifter to the second phase modulator via the Faraday mirror, whereby the horizontally polarized components from the third polarizing beamsplitter are rotated to vertically polarized components by the Faraday mirror and arrive at the second phase modulator at substantially the same time as the vertically polarized components from the third polarizing beamsplitter.

9. The communication channel according to claim 1 wherein the first polarizing beamsplitter and the second polarizing beamsplitter together comprise a single four-port polarizing beamsplitter.

10. The communication channel according to claim 1 wherein the channel is a fiber-optic channel and wherein the first polarizing beamsplitter and the second polarizing beamsplitter together comprise a 2×2 polarizing fiber-optic coupler.

11. The communication channel according to claim 1 further comprising a polarization preparation stage between the source and the first polarizing beamsplitter for producing a linearly polarized light signal with generally equal amplitude vertical and horizontal components.

12. The communication channel according to claim 1 further comprising a polarization preparation stage between the source and the first polarizing beamsplitter for producing a circularly polarized light signal with generally equal magnitude vertical and horizontal components.

13. The communication channel according to claim 1 wherein the source of light signals is a diode laser.

* * * * *